United States Patent
Yang

(10) Patent No.: US 10,250,975 B1
(45) Date of Patent: *Apr. 2, 2019

(54) ADAPTIVE DIRECTIONAL AUDIO ENHANCEMENT AND SELECTION

(71) Applicant: Amazon Technologies, Inc., Seattle, WA (US)

(72) Inventor: Jun Yang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,831

(22) Filed: Oct. 6, 2017

Related U.S. Application Data

(63) Continuation of application No. 13/826,740, filed on Mar. 14, 2013, now Pat. No. 9,813,808.

(51) Int. Cl.
    *H04R 3/00* (2006.01)

(52) U.S. Cl.
    CPC .................................. *H04R 3/005* (2013.01)

(58) Field of Classification Search
    CPC ........ H04M 9/082; H04M 9/08; H04R 3/002; H04R 3/005; H04R 2430/20; H04R 1/20; H04R 1/406; G10L 2021/02166; G10L 2021/02082; G10L 21/0208
    USPC .......... 381/66, 71.1, 71.11, 94.1, 95, 96, 92, 381/122; 379/406.01, 406.02, 406.03, 379/406.08, 406.09, 420.01, 420.02, 379/420.03; 455/569.1, 570
    See application file for complete search history.

(56) References Cited

U.S. PATENT DOCUMENTS

| | | | |
|---|---|---|---|
| 6,449,593 B1 * | 9/2002 | Valve | G01V 1/001 704/233 |
| 7,035,415 B2 | 4/2006 | Belt et al. | |
| 7,099,822 B2 | 8/2006 | Zangi | |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,831,036 B2 | 11/2010 | Beaucoup et al. | |
| 7,881,480 B2 | 2/2011 | Buck et al. | |
| 8,041,054 B2 | 10/2011 | Yeldener et al. | |
| 8,112,272 B2 | 2/2012 | Nagahama et al. | |

(Continued)

FOREIGN PATENT DOCUMENTS

WO    WO2011088053 A2    7/2011

OTHER PUBLICATIONS

Office action for U.S. Appl. No. 13/826,740 dated Oct. 9, 2015, Yang, "Adaptive Directional Audio Enhancement and Selection", 20 pages.

Office action for U.S. Appl. No. 13/826,740, dated Feb. 10, 2017, Yang, "Adaptive Directional /Audio Enhancement and Selection", 22 pages (Continued)

*Primary Examiner* — Jason R Kurr
(74) *Attorney, Agent, or Firm* — Lee & Hayes, P.C.

(57) ABSTRACT

A hands-free audio device has a receive path and a transmit path, which may operate at different audio sampling rates. The transmit path has an interference suppressor that receives a reference signal from the receive path and that suppresses interference in microphone signals received from a microphone array. The interference suppressor is followed in the transmit path by a multi-channel adaptive beamformer that produce a plurality of directional audio signals. A beam selector is configured to select one of the directional audio signals based on voice activity, echo detection, and signal energy.

20 Claims, 4 Drawing Sheets

(56) References Cited

U.S. PATENT DOCUMENTS

| | | |
|---|---|---|
| 8,320,554 B1 | 11/2012 | Chu |
| 8,374,358 B2 * | 2/2013 | Buck .................. G10L 21/0208 |
| | | 381/92 |
| 8,385,557 B2 | 2/2013 | Tashev et al. |
| 8,655,418 B2 | 2/2014 | Barron |
| 2003/0076950 A1 | 4/2003 | Usman et al. |
| 2006/0147063 A1 | 7/2006 | Chen |
| 2007/0150268 A1 | 6/2007 | Acero et al. |
| 2012/0223885 A1 | 9/2012 | Perez |
| 2013/0034241 A1 * | 2/2013 | Pandey .................. H04R 3/005 |
| | | 381/92 |
| 2014/0278394 A1 | 9/2014 | Bastyr et al. |

OTHER PUBLICATIONS

Office Action for U.S. Appl. No. 13/826,740, dated Apr. 9, 2015, Jun Yang, "Adaptive Directional Audio Enhancement and Selection", 19 pages.

Office action for U.S. Appl. No. 13/826,740, dated May 25, 2016, Yang, "Adaptive Directional Audio Enhancement and Selection", 19 pages.

Office Action for U.S. Appl. No. 13/801,714, dated Jun. 12, 2014, Jun Yang, "Cross-Domain Processing for Noise and Echo Suppression", 7 pages.

Office action for U.S. Appl. No. 13/826,740, dated Sep. 20, 2016, Yang, "Adaptive Directional Audio Enhancement and Selection", 22 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

ADAPTIVE DIRECTIONAL AUDIO ENHANCEMENT AND SELECTION

RELATED APPLICATIONS

This application claims priority to and is a continuation of U.S. patent application Ser. No. 13/826,740, filed on Mar. 14, 2013, the entire contents of which are incorporated herein by reference.

BACKGROUND

Hands-free communication devices allow users to communicate using electronic devices without having to hold a handset. In many cases, however, there is very little acoustic isolation between the microphone and the speaker of a hands-free device. The lack of acoustic isolation results in acoustic echo, which can be annoying to users.

In addition, microphones of hands-free devices have broad directional coverage in order to pick up user speech regardless of the location of the user. Because of this, the microphone may pick up ambient noise, which may interfere with desired communications.

Hands-free devices may be used to communicate between individuals as well as to interact with computerized systems using voice. For example, an automated system may use a hands-free communications device to receive spoken commands from a user, and may perform various actions in response to the spoken commands. Such actions may include providing information in spoken form using speech synthesis or generation, rendering media such as music or radio, or other types of actions. In these situations, audio interference such as echo and ambient noise may cause difficulties when attempting to recognize user speech. Various techniques may be used to suppress noise and echo, including various filtering techniques and acoustic beamforming techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques that may be used in hands-free devices and in other situations where ambient noise and/or acoustic echo are present. In one embodiment, a hands-free device may be used as part of a device, service, and/or service platform that interacts with users through speech.

A hands-free device may contain a speaker and an array of microphones. Audio signals from the microphones are processed to suppress ambient noise and acoustic echo, and adaptive beamforming techniques are used to focus audio reception on specific parts of a room or other environment.

In certain embodiments described below, audio signals from individual microphones of a microphone array are processed using a combination of techniques to suppress both ambient noise and acoustic echo in each of the audio signals. The processed audio signals are then used by an adaptive beamformer to produce directional audio signals corresponding to different parts of the environment. Voice detection, energy detection, and far/near-end talk detection are then used to select one of the directional audio signals, which is provided as input to further system components such as downstream communications or processing components, speech recognition components, and so forth.

Figure 1:
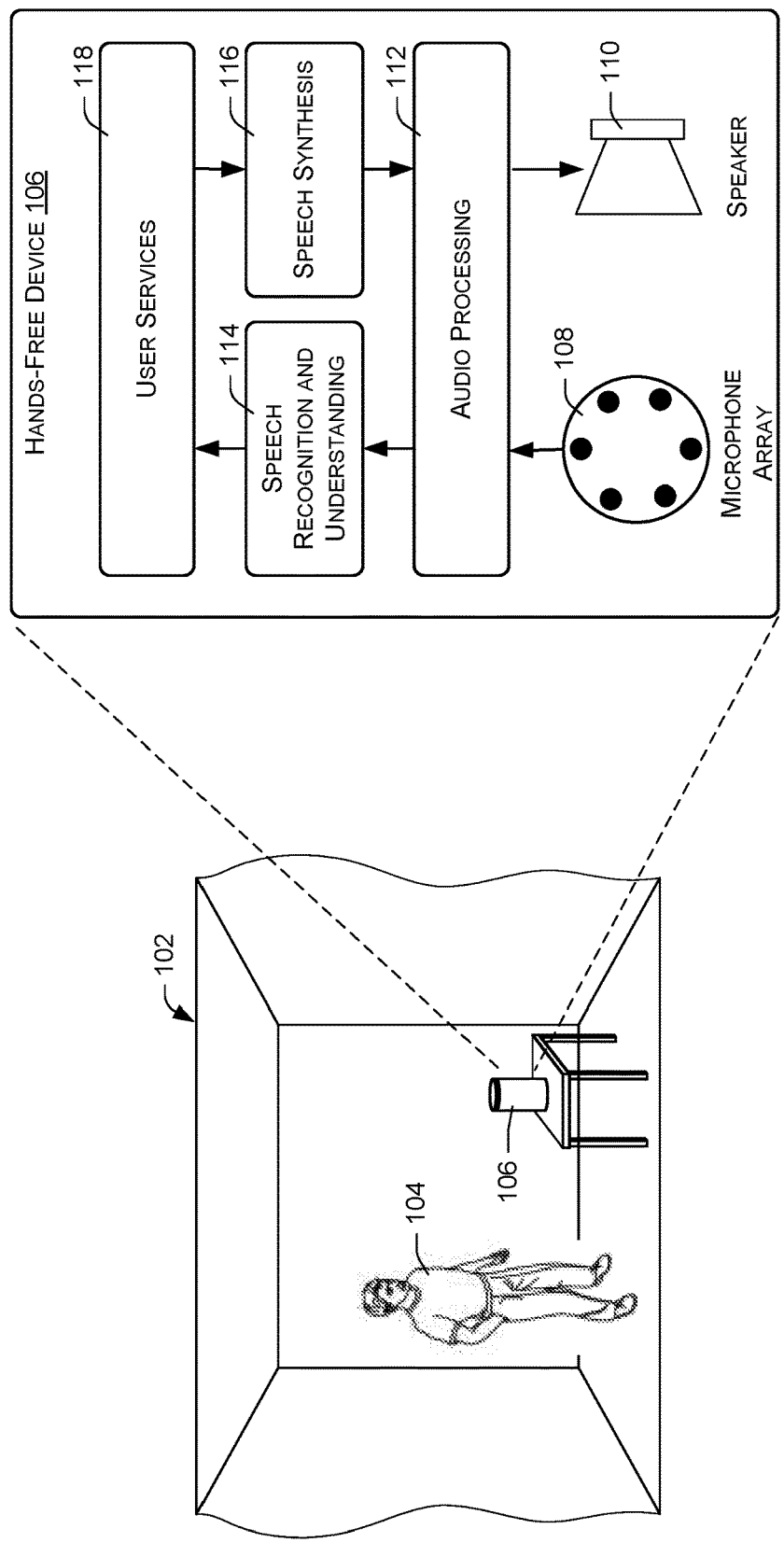
FIG. 1 shows an illustrative environment containing a hands-free device that may be configured to perform adaptive directional audio enhancement and selection.

FIG. 1 shows an example speech interaction system set in a home environment 102 that includes a user 104. The system includes a hands-free device 106 that is configured to receive audio from the environment 102 and to perform actions in response to commands spoken by the user 104. Such actions may include rendering audio such as synthesized speech, music, etc. on the hands-free device 106.

The hands-free device 106 may be positioned in any number of locations (e.g., ceiling, wall, in a lamp, beneath a table, under a chair, etc.). Multiple hands-free devices 106 may be positioned in a single room and used in concert to receive voice commands from users, or one hands-free device 106 may be used to facilitate user interactions from more than one room and/or more than one user.

The right side of FIG. 1 shows high-level components of an example hands-free device 106. The hands-free device 106 may include a microphone array 108 and a speaker 110. The microphone array 108 may comprise any number of spatially separated individual microphones. In the example shown, the microphone array comprises a hexagonal array of six omnidirectional microphones. Alternatively, the microphone array may comprise a triangular array of three microphones, a square array of four microphones, or any other arrangement that may be suitable in a particular environment for use in conjunction with acoustic beamforming techniques. Each microphone of the array 108 produces a respective individual audio signal, which potentially contains ambient noise as well as acoustic echo resulting from audio rendered by the hands-free device 106.

The speaker 110 is configured to render audio based at least in part on a received output audio signal. The speaker 110 may have an omnidirectional audio projection pattern to produce audio that can be heard in any part of the environment 102.

The hands-free device 106 may include audio processing components or functionality 112 for processing audio received from the microphone array 108 as well as for processing audio to be rendered by the speaker 110. The audio processing functionality 112 may include noise and echo reduction, beamforming, voice detection, beam selection, and so forth. Further details regarding the audio processing functionality 112 will be described in more detail below.

The hands-free device 106 may also include speech recognition and understanding components or functionality 114, which may be configured to recognize and understand speech or other utterances of the user 104. The hands-free device 106 may also include speech synthesis components or functionality 116 for producing speech response to the user 104.

The hands-free device 106 may implement various types of user services 118, which may be invoked in response to spoken commands by the user 104. Services may include providing requested media or information such as music, weather, news, etc. Services may also include interacting with various components and systems, which may be local to the environment 102 and/or accessible remotely. Remotely accessible components and systems may include network-accessible services, including servers and services that are accessed over the Internet.

The functionality illustrated by FIG. 1 may be implemented by various types of logic, including digital processors, signal processors, or similar types of devices that perform operations based on instructions and/or programs stored in associated memory. The described functionality may also be performed by other means, which may include non-programmable elements such as analog components, discrete logic elements, and so forth.

Furthermore, although the hands-free device 106 is shown in FIG. 1 as integrating various functionality, all or parts of the described functionality may be distributed and performed by other systems or components, including remotely located systems and/or network-accessible systems. For example, any or all of the audio processing 112, speech recognition and understanding 114, speech synthesis 116, and user services 118 may be implemented or provided by one or more network based servers or services, including services accessible through public wide-area networks such as the Internet. As another example, the various types of functionality illustrated in FIG. 1 may be implemented by different components within a home or other local environment, such as by various computers, servers, components, sensors, and so forth.

Figure 2:
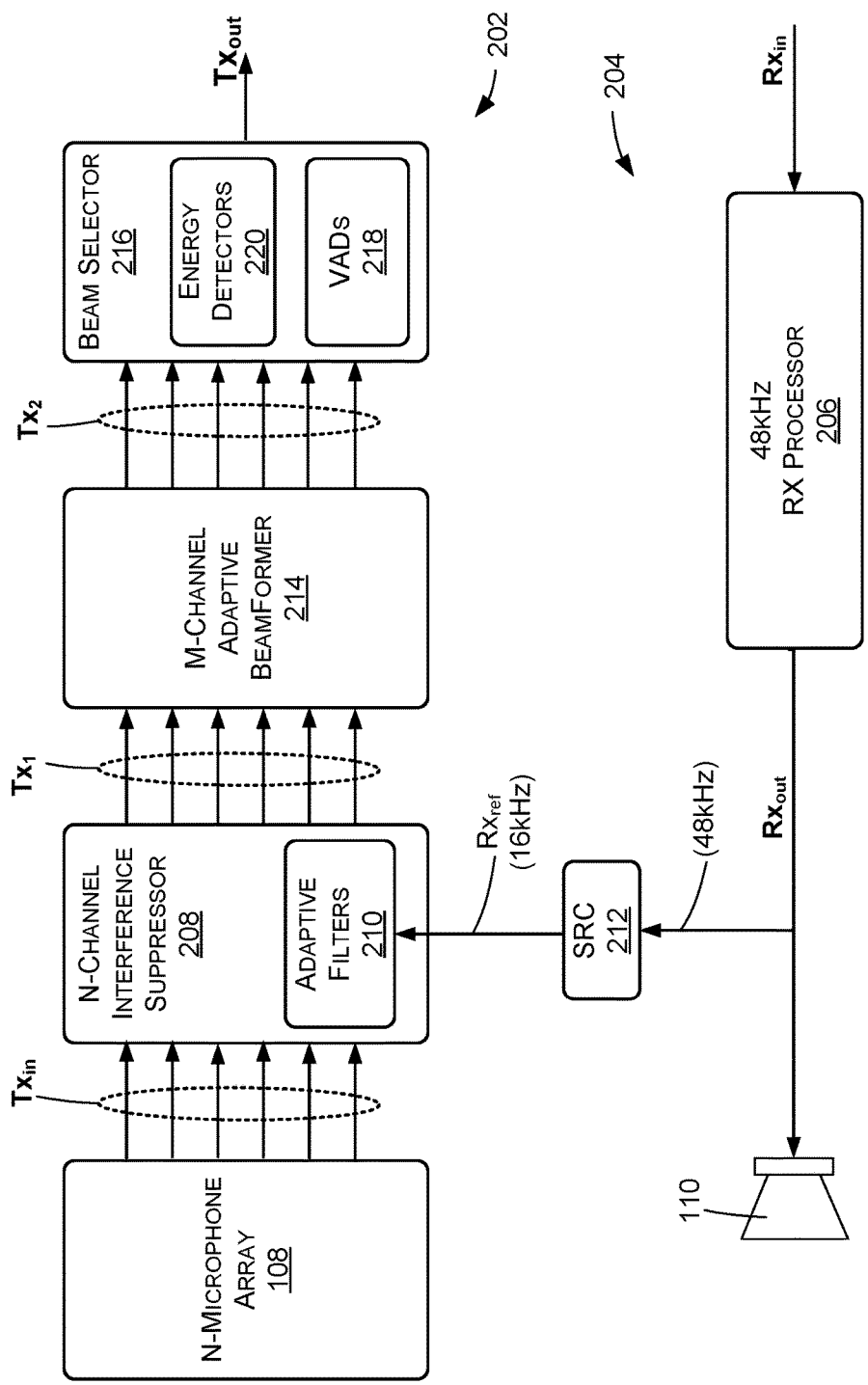
FIG. 2 is a block diagram illustrating a process and methodology that may be used in a hands-free device to perform adaptive directional audio enhancement and selection.

FIG. 2 illustrates logical processing components and methodology that may be implemented by the audio processing component 112 of FIG. 1, as well as illustrating methods and processes that may be used for processing audio in a hands-free device or other type of device. Although certain audio processing techniques are described below in the context of FIG. 1, the described techniques may be performed in other environments and for other purposes. For example, the described audio processing techniques may be used in telecommunications devices and systems, handsets, conferencing systems, headsets, ear-worn devices, hearing assist devices, etc.

The system of FIG. 2 includes a transmit-path 202 and a receive-path 204. The transmit-path 202 processes a transmit signal Tx that originates with the microphone array 108 and that is eventually provided to audio consumer components such as speech recognition components, natural language understanding components, or other downstream audio signal components or consumers. The transmit signal Tx may comprise, at various points in the transmit-path, a composite signal comprising multiple individual audio signals or audio channels. For example, the microphone array 108 produces multiple transmit-path audio signals $Tx_{in}$, corresponding respectively to individual microphones of the microphone array 108. At other points in the transmit path, the transmit signal Tx may comprise a single audio signal, such as the single channel transmit-path output signal $Tx_{out}$ that is provided to audio consumer components.

The receive path 204 processes a receive signal Rx that is received from an audio producer such as a speech synthesis component, media source, communication component, etc., for rendering by the speaker 110. The receive path 204 may include various processing components and/or actions 206. The received input signal from the audio producer is referred to herein as a receive-path input signal $Rx_{in}$. The processing components 206 produce a receive-path output signal $Rx_{out}$ that is used to drive the speaker 110.

The audio signals shown and discussed herein may comprise analog signals and/or may comprise continuous sequences of sampled digital amplitude values. For example, audio received from the microphone array may be evaluated in the time domain at a predetermined sampling rate to produce sampled amplitude values. Time-domain audio signals may be converted to frequency domain signals or values for certain types of processing and filtering that will be discussed below.

Receive-path processing is performed at a relatively high sampling rate in order to produce high fidelity audio at the speaker 110. The transmit path 202 may use a relatively low sampling rate. In the described embodiment, receive-path processing is performed using a 48 kHz sampling rate, while transmit-path processing is performed using a 16 kHz sampling rate. In other embodiments, both the receive path and the transmit path may be implemented so that they use the same sampling rate, for example, both the receive path and the transmit path may use a sampling rate of 48 kHz.

A system such as shown by FIG. 2 may be subject to echoing based on combinations of audio received by the receive path 204 and the microphone array 108. "Near-end" or "near-side" refer to the local side of hands-free audio device 106 where the AEC is located. The sounds picked up by the microphone array 108 or its individual elements, include a near-end user voice, background or environmental noise, reverberations of the near-end user voice, and the reflected loudspeaker signals 110 (i.e., the acoustic echo). Near-end user voice is often referred to as near-end "talk," particularly in voice communication systems.

"Far-end audio" refers to sound generated by a user or device that is remote to the local device (e.g., the hands-free device 106). In the environment described herein, far-end audio comprises the audio represented by the receive-path input signal Rain, which may comprise music, far-end speech, etc. In two-way telecommunications environments, the far-end audio may comprise the voice of a remote user. Far-end audio is often referred to as far-end "talk," particularly in voice communications systems.

Echoing can be caused by near-end conditions or factors, such as by acoustic coupling between the speaker 110 and the microphone array 108 and/or by electrical coupling between the $TX_{out}$ and $RX_{in}$ in the local device 106. Similar conditions at the far end may similarly result in undesired echoing.

The term "single-talk" refers to a situation in which an audio signal contains primarily near-end user voice or far-end audio. The term "double-talk" refers to a situation in which near-end and far-end users talk at the same time.

Figure 3:
FIG. 3 is a block diagram illustrating actions that may be performed by a receive path of a hands-free device such as that shown by FIG. 1.

FIG. 3 shows an example of processing components and/or actions 206 that may be applied in the receive path 204. An audio enhancement component 302 receives the receive input signal $Rx_{in}$. The audio enhancement component 302 may be configured enhance the receive input signal $Rx_{in}$ through various audio enhancement techniques, such as noise reduction and voice formant enhancement for voice applications, bass enhancement for music applications, and environment noise-dependent volume control for both voice and music applications. The receive-path audio signal produced by the audio enhancement component 302 is referred to in FIG. 3 as $Rx_1$.

The receive-path processing components 206 may also include a dynamic level controller 304 that performs dynamic level control (DLC), which is sometimes also referred to as automatic gain control (AGC). The dynamic level controller 304 receives the receive-path signal $Rx_1$ from the enhancement component 302 and amplifies or compresses $Rx_1$ to achieve desired audio output levels at the speaker 110. The receive-path output of the dynamic level controller 304 is referred to in FIG. 3 as $Rx_2$.

The receive-path processing components 206 may also include an equalizer 306 that performs equalization of the receive-path audio signal Rx to compensate for audio speakers having poor frequency responses. The equalizer 306 receives the receive-path signal $Rx_2$ from the dynamic level controller 304. The receive-path output of the equalizer 306 is referred to in FIG. 3 as $Rx_3$.

The receive-path processing components 206 may also include a limiter or clipping preventer 308 that is configured to attenuate peaks of the receive-path audio signal Rx that might otherwise cause clipping of audio rendered on the speaker 110. Clipping prevention helps avoid non-linear echoing and speaker distortion in the receive-path audio signal Rx. The clipping preventer 308 receives the receive-path signal $Rx_3$ from the equalizer 306. The clipping preventer 308 produces the receive-path output signal $Rx_{out}$, which us used to drive the speaker 110.

The receive-path processing components 206 may be configured to process the receive-path signal Rx at a 48 kHz sampling rate in order to provide good performance for music reproduction.

The receive path 204 may include other components, not shown, such as amplifiers, other types of filters, and so forth. For example, high-pass filtering may be applied to remove DC components of audio signals and to filter out low-frequency noise.

Referring again to FIG. 2, the microphone array 108 produces multiple transmit path input audio signals $Tx_{in}$ corresponding respectively to individual microphones of the microphone array 108. For purposes of discussion, the microphone array will be described as having N microphones, and $Tx_{in}$ therefore includes N individual audio signals or channels. N may be equal to six in certain embodiments. Each of the N individual audio signals or channels potentially contains interference in the form of ambient noise and/or acoustic echo components, both of which may interfere with any near-end audio or speech that is present in the individual audio signals.

The transmit path 202 may include an N-channel interference suppressor 208, that is configured to suppress ambient noise and acoustic echo components in the individual audio signals $Tx_{in}$. The interference suppressor 208 receives the input audio signals $Tx_{in}$ and produces echo/noise-suppressed audio signals $Tx_1$. The interference suppressor 208 has a discrete processing component, channel, or path for each of the N microphone-generated audio signals $Tx_{in}$, and may therefore produce an echo/noise-suppressed audio signal $Tx_1$ corresponding to each of the N microphones of the microphone array 108.

The interference suppressor 208 may perform acoustic echo and ambient noise suppression in a variety of ways. In certain implementations, the interference suppressor 208 may implement an adaptive linear finite-impulse-response (FIR) filter 210 for each of the N audio signals $Tx_{in}$ generated by the microphone array 108. Each of the filters 210 is responsive to an echo reference signal, referred to in FIG. 2 as $Rx_{ref}$, which is derived from the receive path 204 and the receive-path audio signal Rx, and which used by the filters 210 as an estimate of acoustic echo. In particular, the echo reference signal $Rx_{ref}$ is generated from the receive-path output signal $Rx_{out}$ by down-sampling from the 48 kHz sampling rate of the receive path 204 to the 16 kHz sampling rate of the transmit path 202, using a sampling rate converter (SRC) 212. Accordingly, the echo reference signal $Rx_{ref}$ has a 16 kHz sample rate, which is compatible with the 16 kHz sample rate used in the transmit path 202.

In addition to the linear adaptive filtering, the interference suppressor 208 may perform additional processing to reduce both ambient noise components and residual echo components in the transmit-path input audio signals $Tx_{in}$. For example, the adaptive FIR filtering may be followed by frequency-domain filtering or processing to address both ambient noise and residual echo. Further time-domain processing may then be applied to address any remaining residual echo.

The interference suppressor 208 is followed in the transmit path 202 by an M-channel adaptive beamformer 214, which receives and is responsive to the noise/echo-suppressed audio signals $Tx_1$ to produce a plurality of directional audio signals $Tx_2$, based at least in part on the individual audio signals $Tx_1$. In the described embodiment, the adaptive beamformer 214 has M individual adaptive beamformers, and produces M directional audio signals $Tx_2$. In the example shown, M is equal to N, although this need not be the case in every embodiment. The adaptive beamformer 214 produces six directional audio signals $Tx_2$, each of which emphasizes sound arriving from a different direction relative to the microphone array 108

The M-channel adaptive beamformer 214 has a plurality of channels, corresponding respectively to different combinations of microphones. In the described embodiment, in which the microphone array 108 comprises a circular or hexagonal arrangement of six microphones, each individual beamformer or beamformer channel of the beamformer 214 is responsive to audio from a pair of opposing microphones, referred to as a primary microphone and a reference microphone. The reference microphone is the microphone positioned opposite the primary microphone in the array. Each of the six beamformer channels uses a different one of the six microphones as its primary microphone.

Figure 4:
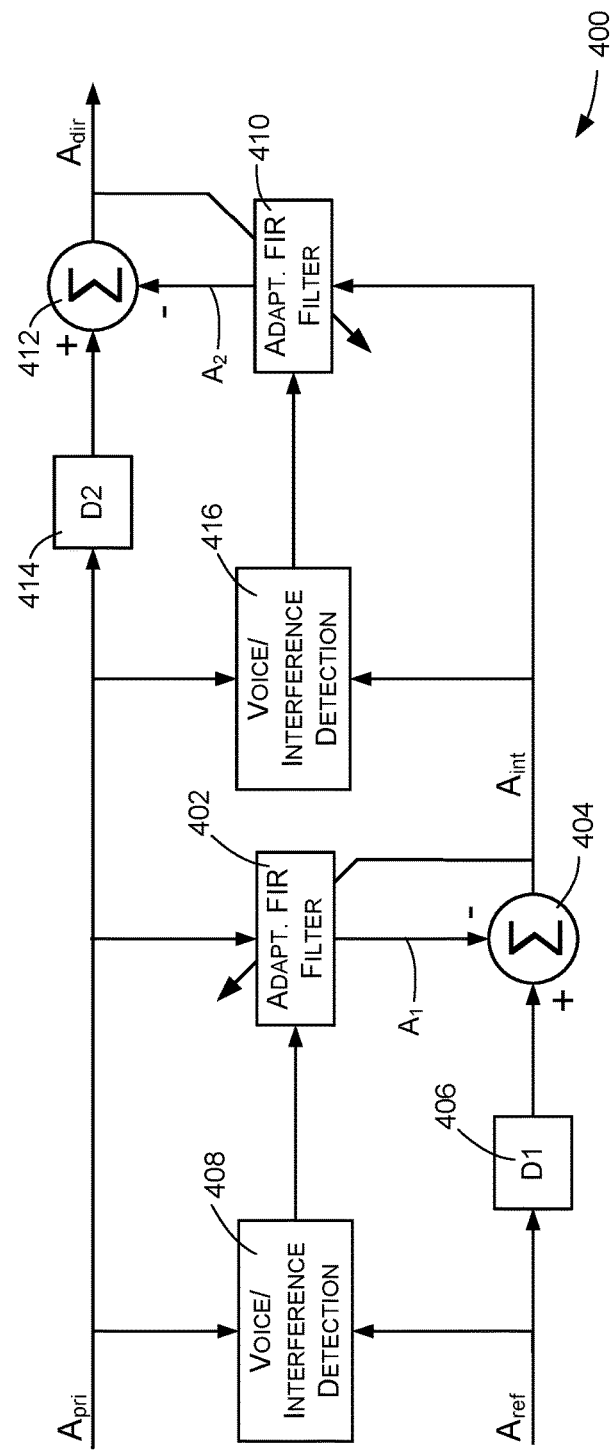
FIG. 4 is a block diagram of an adaptive beamformer that may be used in conjunction with the hands-free device of FIG. 1.

FIG. 4 shows an example beamformer method and configuration 400 that may be used as a channel in the M-channel adaptive beamformer 214. In this example, the beamformer channel is responsive to a primary audio signal $A_{pri}$ corresponding to the primary microphone associated with the channel, and to a reference audio signal $A_{ref}$ corresponding to the secondary microphone associated with the channel. The beamformer produces a directional signal $A_{dir}$, which is adaptively filtered to reduce noise and to enhance speech with respect to a particular direction relative to the hands-free device 106.

The adaptive beamformer 400 has a first stage of processing that produces an intermediate audio signal $A_{int}$ based on the primary audio signal $A_{pri}$ and the reference audio signal $A_{ref}$. More specifically, the primary audio signal $A_{pri}$ is filtered by a first adaptive FIR filter 402 to produce an estimated target voice signal $A_1$, which is subtracted from the reference audio signal $A_{ref}$ at 404 to produce the intermediate audio signal $A_{int}$. The $A_{ref}$ signal is delayed by a delay element 406 to compensate for the delay of the adaptive FIR filter 402. The delay value D1 is approximately equal to half of the length of the adaptive FIR filter 402.

The intermediate audio signal $A_{int}$ contains or emphasizes noise relative to the target voice. The adaptive FIR filter 402 uses variable weights that are updated or frozen in response to a voice/interference detector 408. Voice and/or interference may be detected by evaluating the relative energies of the primary audio signal $A_{pri}$ and the reference audio signal $A_{ref}$, where higher ratios of primary to reference audio energies indicate increasing likelihoods of voice presence, and lower ratios of primary to reference audio energies indicate increasing likelihoods of interference. The voice/interference detector 406 may not only consider the above energy ratio, but also evaluate the primary audio signal $A_{pri}$ and the reference audio signal $A_{ref}$ to detect the presence of voice activity.

The adaptive weights used by the first adaptive FIR filter 402 may be frozen at values corresponding to times when there is relatively high interference and/or low likelihood of voice activity.

The beamformer 400 has a second stage of processing that produces the directional signal $A_{dir}$ based on the primary audio signal $A_{pri}$ and the intermediate audio signal $A_{int}$. More specifically, the intermediate audio signal $A_{int}$ is filtered by a second adaptive FIR filter 410 to produce an estimated interference signal $A_2$, which is subtracted from the primary audio signal $A_{pri}$ at 412 to produce the directional signal $A_{dir}$. The $A_{pri}$ signal is delayed by a delay element 414 to compensate for the delay of the adaptive FIR filter 410. The delay value D2 is approximately equal to half of the length of the adaptive FIR filter 410.

The variable weights of the second adaptive FIR filter 410 are updated or frozen in response to a second voice/interference detector 416. The voice/interference detector 416 may detect voice and/or interference by evaluating the relative energies of the primary audio signal $A_{pri}$ and the intermediate audio signal $A_{int}$, where lower ratios of primary to intermediate audio energies indicate increasing likelihoods of interference and higher ratios of primary to intermediate audio energies indicate increasing likelihoods of voice presence. The voice/interference detector 412 may not only consider the above energy ratio, but also evaluate the intermediate audio signal $A_{int}$ to detect the presence of voice activity. The adaptive weights used by the second adaptive FIR filter 410 may be frozen at values corresponding to times when there is relatively low interference and/or high likelihood of voice activity.

The directional signal $A_{dir}$ as produced in the example of FIG. 4 is thus adaptively enhanced to emphasize voice components and to de-emphasize noise or interference components. A configuration such as this may be used to reduce background noise as well as near-end reverberation due to reflection and acoustic echo or feedback.

Referring again to FIG. 2, the transmit path 202 may further include a beam selector 216 that selects one of the directional audio signals $Tx_2$ for output as $Tx_{out}$. The beam selector 216 is configured to select one of the directional audio signals $Tx_2$ based on voice activity. For example, the beam selector 216 may have voice activity detectors (VADs) 218, corresponding respectively to each of the directional audio signals $Tx_2$. Each VAD 218 may be configured to detect voice activity in the corresponding directional audio signal $Tx_2$, and to determine which of the directional audio signals $Tx_2$ are most likely to contain voice. The beam selector 216 is configured to select the directional audio signal that is most likely to contain voice, and to present that directional audio signal as $Tx_{out}$.

In some embodiments, the selection of one of the directional audio signals $Tx_2$ may also be based on relative energies of the audio signals, and further based on whether acoustic echo in the transmit path 202 is the result of near-end or far-end audio. In embodiments such as this, the beam selector may have or be associated with a plurality of signal energy measurers 220 corresponding respectively to each of the directional audio signals $Tx_2$. Each energy measurer 220 may be configured to measure, evaluate, or calculate the signal energy exhibited by the corresponding directional audio signal $Tx_2$. The beam selector 216 may select from the directional audio signals based in part on their signal energies.

Figure 5:
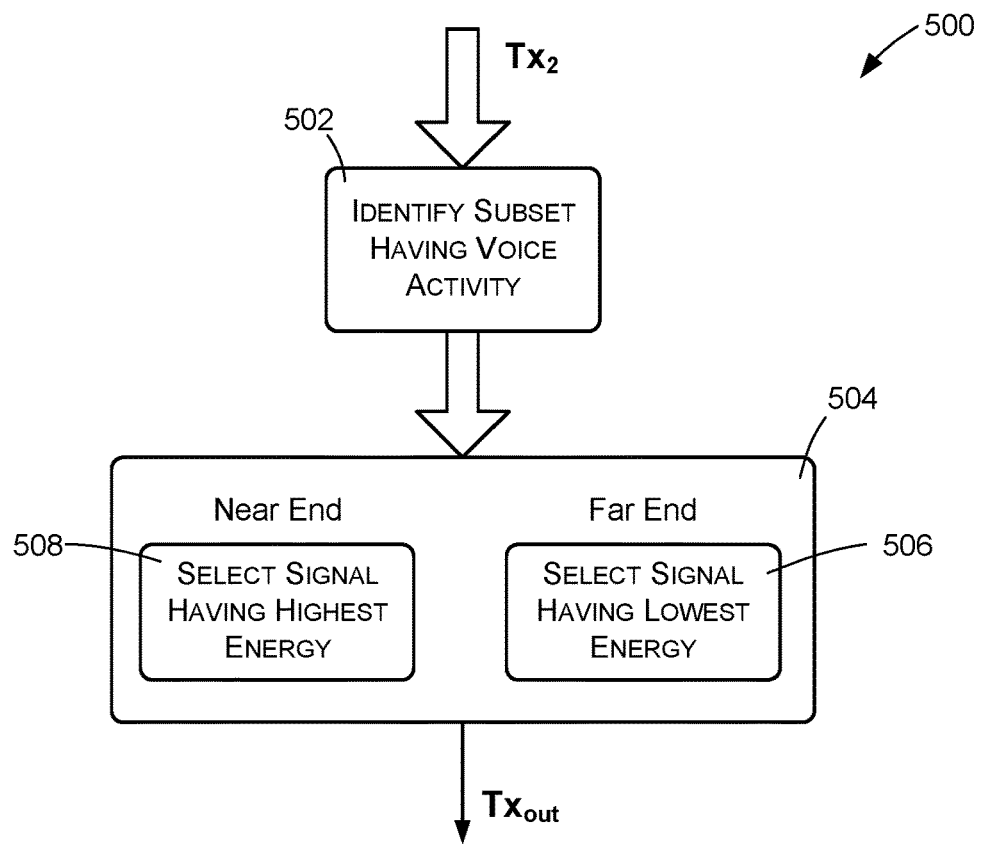
FIG. 5 is a block diagram illustrating actions that may be performed by a beam selector in conjunction with the hands-free device of FIG. 1.

FIG. 5 illustrates an example process 500 that may be performed by the beam selector 216 to select from the directional audio signals $Tx_2$ based on the energies of the directional audio signals $Tx_2$. At 502, the beam selector 216 performs voice activity detection to identify a subset of the directional audio signals $Tx_2$ having at least a predetermined threshold of voice activity. A subsequent action 504 comprises evaluating relative energies of the directional audio signals $Tx_2$, and selecting one of the directional audio signals $Tx_2$ from the subset of signals based at least in part on whether acoustic echo present in the transmit path is due to far-end and/or near-end talk. In the case of far-end single talk, an action 506 is performed of selecting a low-energy one of the directional signals that has the lowest energy of those in the identified subset. Otherwise, in the case of near-end single talk or a simultaneous near-end and far-end talk (i.e., double talk), an action 508 is performed of selecting a high-energy one of the directional signals that has the highest energy of those in the identified subset.

Additional processing components, not shown, may be incorporated in the transmit path 202 in certain embodiments. As an example, high-pass filtering may be applied to the transmit-path input audio signals $Tx_{in}$ to remove DC signal components and to filter out low-frequency noise.

Although the description above has assumed the use of a single speaker 110, multiple speakers may be used as part of or in conjunction with the hands-free device 106 in different embodiments. In a system with two stereo speakers that are not physically near each other, and which may render different audio, the receive path 204 needs to accommodate two different acoustic echo sources and paths. This can be accomplished by generating two echo reference signals $Rx_{ref}$ based on the respective receive-path output signals $Rx_{out}$ that drive the two stereo speakers. The interference suppressor 208 is configured in this situation to perform interference suppression based on the two echo reference signals $Rx_{ref}$.

In situations where two or more speakers are located closely to each other, their corresponding $Rx_{out}$ signals may be averaged for use as a single echo reference signal $Rx_{ref}$ by the interference suppressor 208.

The receive path 204 may use stereo processing techniques in both of these situations in order to reduce computational complexity. The receive path processing may be performed at a relatively high sampling rate, such as 48 kHz, and the $Rx_{ref}$ signals may be generated by down-sampling the $Rx_{out}$ signals to 16 kHz.

Figure 6:
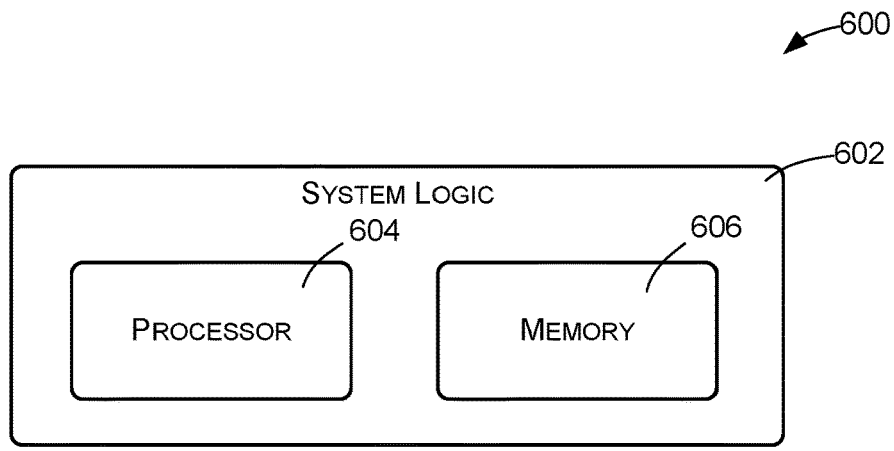
FIG. 6 is a block diagram illustrating components of a user device, such as a hands-free device, that may be used to present implement the techniques described herein.

FIG. 6 shows an example of an audio system, element, or component 600 that may be used to perform automatic noise and echo reduction in accordance with the techniques described above. Although the example of FIG. 6 shows a programmatic implementation, the functionality described above may be performed by other means, including non-programmable elements such as analog components, discrete logic elements, and so forth. Thus, in some embodiments various ones of the components, functions, and elements described herein may be implemented using programmable elements such as digital signal processors, analog processors, and so forth. In other embodiments, one or more of the components, functions, or elements may be implemented using specialized or dedicated circuits, including analog circuits and/or digital logic circuits. The term "component", as used herein, is intended to include any hardware, software, logic, or combinations of the foregoing that are used to implement the functionality attributed to the component.

The audio system 600 of FIG. 6 comprises system logic 602, which in some embodiments may comprise a programmable device or system formed by a processor 604, associated memory 606, and other related components. The processor 604 may be a digital processor, a signal processor, an analog processor, or similar type of device that performs operations based on instructions and/or programs stored in the memory 606.

In embodiments using programmable elements, such as shown by FIG. 6, certain aspects of the functionality described above may be implemented through the use of computer-executable instructions or software, such as program modules, that are stored in the memory 606 and executed by the processor 604. Generally, program modules include routines, programs, objects, components, data structures, etc., and define operating logic for performing particular tasks or implement particular abstract data types. The memory 606 may comprise computer storage media and may include volatile and nonvolatile memory. The memory 606 may include, but is not limited to, RAM, ROM, EEPROM, flash memory, or other memory technology, or any other medium which can be used to store media items or applications and data which can be accessed by the system logic 602. Software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the discussion above sets forth an example implementation of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. An electronic device comprising:
   a first microphone;
   a second microphone;
   one or more processors; and
   one or more computer-readable media storing instructions that, when executed by the one or more processors, cause the one or more processor to perform operations comprising:
     generating a first audio signal using the first microphone;
     generating a second audio signal using the second microphone;
     producing a first directional audio signal based at least in part on the first audio signal and the second audio signal;
     producing a second directional audio signal based at least in part on the first audio signal and the second audio signal;
     detecting presence of near-end audio in the first directional audio signal;
     detecting presence of far-end audio in the second directional audio signal;
     determining a first signal energy associated with the first directional audio signal;
     determining a second signal energy associated with the second directional audio signal;
     determining that the first signal energy is greater than the second signal energy;
     selecting the first directional audio signal based at least in part on the presence of the near-end audio in the first directional audio signal and based at least in part on the first signal energy being greater than the second signal energy; and
     sending the first directional audio signal.

2. The electronic device as recited in claim 1, the operations further comprising:
   suppressing first interference in the first audio signal to produce a first processed audio signal; and
   suppressing second interference in the second audio signal to produce a second processed audio signal,
   wherein:
     the producing the first directional audio signal comprises producing the first directional audio signal based at least in part on the first processed audio signal and the second processed audio signal; and
     the producing the second directional audio signal comprises producing the second directional audio signal based at least in part on the first processed audio signal and the second processed audio signal.

3. The electronic device as recited in claim 1, wherein producing the first directional audio signal comprises:
   estimating a voice signal based at least in part on the first audio signal;
   subtracting at least a portion of the voice signal from the second audio signal to produce an intermediate audio signal;
   estimating an interference signal based at least in part on the intermediate audio signal; and
   subtracting at least a portion of the interference signal from the first audio signal to produce the first directional audio signal.

4. The electronic device as recited in claim 1, wherein:
   the detecting the presence of the near-end audio in the first directional audio signal is based at least in part on the first signal energy; and
   the detecting the presence of the far-end audio in the second directional audio signal is based at least in part on the second signal energy.

5. The electronic device as recited in claim 1, the operations further comprising:
   identifying the first directional audio signal as including a threshold presence of voice activity; and
   identifying the second directional audio signal as including the threshold presence of voice activity.

6. The electronic device as recited in claim 1, wherein the first directional audio signal represents user speech, and wherein the operations further comprise:
   analyzing the first directional audio signal;
   identifying the user speech represented by the first directional audio signal; and
   causing output of content based at least in part on identifying the user speech.

7. The electronic device as recited in claim 1, further comprising a speaker, and wherein the operations further comprise:
   causing the speaker to output content represented by a third audio signal,
   wherein at least a portion of the far-end audio corresponds to the content output by the speaker.

8. A method comprising:
   receiving a first audio signal from a first microphone;
   receiving a second audio signal from a second microphone;
   producing directional audio signals based at least in part on the first audio signal and the second audio signal;
   detecting presence of near-end audio in at least one of the directional audio signals;
   detecting presence of far-end audio in at least one of the directional audio signals;
   determining a signal energy associated with a first directional audio signal of the directional audio signals;
   selecting the first directional audio signal based at least in part on the presence of the near-end audio and the signal energy; and
   sending the first directional audio signal.

9. The method as recited in claim 8, wherein the signal energy comprises a first signal energy, and wherein the method further comprises:
   determining a second signal energy associated with a second directional audio signal of the directional audio signals; and
   determining that the first signal energy is greater than the second signal energy,
   wherein selecting the first directional audio signal is further based at least in part on the determining that the first signal energy is greater than the second signal energy.

10. The method as recited in claim 8, further comprising:
    determining that the signal energy corresponds to a highest signal energy among the directional audio signals,
    wherein selecting the first directional audio signal is further based at least in part on the determining that the signal energy corresponds to the highest signal energy.

11. The method as recited in claim 8, further comprising:
    suppressing first interference in the first audio signal to produce a first processed audio signal; and
    suppressing second interference in the second audio signal to produce a second processed audio signal,
    wherein the producing the directional audio signals comprises producing, based at least in part on the first processed audio signal and the second processed audio signal, the directional audio signals.

12. The method as recited in claim 8, wherein the producing the directional audio signals comprises at least:
    estimating a voice signal based at least in part on the first audio signal;
    subtracting at least a portion of the voice signal from the second audio signal to produce an intermediate audio signal;
    estimating an interference signal based at least in part on the intermediate audio signal; and
    subtracting at least a portion of the interference signal from the first audio signal to produce the first directional audio signal.

13. The method as recited in claim 8, wherein the signal energy comprises a first signal energy, and wherein the method further comprises:
    identifying a subset of the directional audio signals that include a threshold presence of voice activity, the subset including at least the first directional audio signal and a second directional audio signal of the directional audio signals; and
    determining a second signal energy associated with the second directional audio signal,
    wherein the selecting the first directional audio signal is further based at least in part on the second signal energy.

14. The method as recited in claim 8, wherein the signal energy comprises a first signal energy, and wherein the method further comprises:
    determining a second signal energy associated with a second directional audio signal of the directional audio signals,
    wherein:
       the detecting the presence of the near-end audio in the at least one of the directional audio signals comprises detecting the presence of the near-end audio in the first directional audio signal based at least in part on the first signal energy; and
       the detecting the presence of the far-end audio in the at least one of the directional audio signals comprises detecting the presence of the far-end audio in the second directional audio signal based at least in part on the second signal energy.

15. The method as recited in claim 8, wherein the first directional audio signal represents user speech, and wherein the method further comprises:
    analyzing the first directional audio signal;
    identifying the user speech represented by the first directional audio signal; and
    outputting content based at least in part on the user speech.

16. The method as recited in claim 8, further comprising:
    causing a speaker to output content represented by a third audio signal,
    wherein at least a portion of the far-end audio corresponds to the content output by the speaker.

17. A system comprising:
    one or more processors; and
    one or more computer-readable media storing instructions that, when executed by the one or more processors, cause the one or more processors to perform operations comprising:
       receiving a first audio signal;
       receiving a second audio signal;
       producing directional audio signals based at least in part on the first audio signal and the second audio signal;
       detecting presence of far-end audio in at least one of the directional audio signals;
       determining a signal energy associated with a first directional audio signal of the directional audio signals;
       determining a second signal energy associated with a second directional audio signal of the directional audio signals;
       determining that the second signal energy is greater than the first signal energy;

selecting the first directional audio signal based at least in part on the presence of the far-end audio and the second signal energy being greater than the first signal energy; and sending the first directional audio signal.

18. The system as recited in claim 17, wherein the detecting the presence of the far-end audio in the at least one of the directional audio signals comprises detecting the presence of the far-end audio in the second directional audio signal based at least in part on the second signal energy.

19. The system as recited in claim 17, the operations further comprising:

suppressing first interference in the first audio signal to produce a first processed audio signal; and suppressing second interference in the second audio signal to produce a second processed audio signal, wherein the producing the directional audio signals comprises producing, based at least in part on the first processed audio signal and the second processed audio signal, the directional audio signals.

20. The system as recited in claim 17, wherein the producing the directional audio signals comprises at least:

estimating a voice signal based at least in part on the first audio signal;

subtracting at least a portion of the voice signal from the second audio signal to produce an intermediate audio signal;

estimating an interference signal based at least in part on the intermediate audio signal; and subtracting at least a portion of the interference signal from the first audio signal to produce the first directional audio signal.

* * * * *